United States Patent Office 3,542,765
Patented Nov. 24, 1970

1

3,542,765
3-AMINO-RIFAMYCIN S AND -RIFAMYCIN
SV DERIVATIVES
Hans Bickel, Binningen, and Wilhelm Kump, Therwil,
Switzerland, assignors to Ciba Corporation, New York,
N.Y., a corporation of Delaware
No Drawing. Filed Oct. 23, 1967, Ser. No. 677,022
Claims priority, application Switzerland, Oct. 25, 1966,
15,537/66
Int. Cl. C07d 87/54
U.S. Cl. 260—239.3                                8 Claims

ABSTRACT OF THE DISCLOSURE 3-amino-rifamycin S and -rifamycin SV derivatives in which the 3-amino group is derived from a carbocyclic or heterocyclic aromatic amine and hydrogenated derivatives and salts thereof, show bacteriostatic activity. They are obtained by condensation of rifamycin S or rifamycin SV with the corresponding amine.

SUMMARY OF THE INVENTION

The present invention concerns and has for its object the provision of new 3-amino-rifamycin S and -rifamycin SV derivatives of the formulae (I)

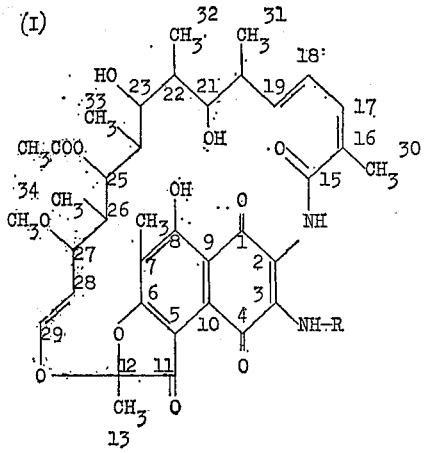

(II)

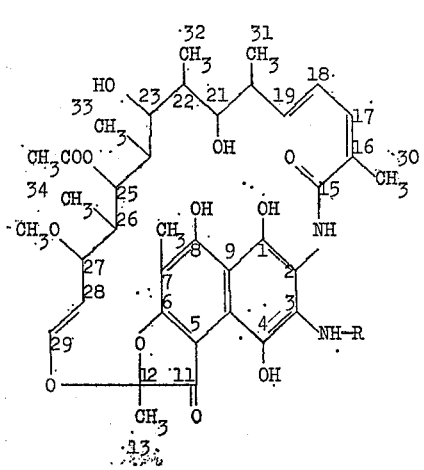

2 and of their derivatives at least partially hydrogenated in positions 16, 17, 18, 19, 28, 29, such as the 16-, 17-, 18-, 19-tetrahydro- or 16-, 17-, 18-, 19-, 28-, 29-hexahydro derivatives, in which R represents the residue of a carbocyclic-aromatic or heterocyclic-aromatic compound, any substituent of which in the ortho-positions to the carbon atom linked with the —NH-group is different from a free primary amino group, free hydroxyl or mercapto group, and a process for the manufacture thereof. Said products possess antibiotic activity and are useful as chemotherapeutics.

DESCRIPTION OF THE PREFERRED
EMBODIMENTS

In the new compounds of the above formulae the said carbocyclic-aromatic or heterocyclic-aromatic residue R is above all a phenyl, naphthyl, pyridyl, pyrimidinyl, pyridazinyl, imidazolyl, pyrazinyl, thiazolyl, oxazolyl, isoxazolyl, pyrazolyl or triazolyl residue which may be substituted on the carbon atoms and, if desired, also on the hetero atoms, with the proviso that in ortho-position to the carbon atom linked with the 3-NH group of the 3-amino-rifamycin S or -rifamycin SV derivatives, there is, if any, at most one substituent which is different from a free primary amino group, a free hydroxyl or mercapto group. The following aromatic and heterocyclic residues should be specially mentioned: Phenyl, ortho-, meta- and para-tolyl, para-ethyl-phenyl, ortho-, meta- and para-chlorophenyl, -bromophenyl and -iodophenyl residues, the para-carboxyphenyl and para-hydroxyphenyl residue, meta- and para-nitrophenyl, the 2-, 3- and 4- pyridyl, 3, 4, 5- or 6-methyl-2-pyridyl, 2, 4, 5- or 6-methyl-3-pyridyl, and 2, 3, 5- or 6-methyl-4-pyridyl, the 2-, 5- or 6-pyrimidinyl residue and their methylated derivatives, the 2-thiazolyl, 2-oxazolyl, 5-isoxazolyl, 2-imidazolyl and 4-pyrazolyl radical.

Substituents are, for example, the hydroxyl, mercapto, lower alkyl, lower alkoxy, lower alkylthio, nitro, amino, carboxyl, sulpho or cyano group or halogen atoms, especially chlorine, bromine or iodine. Cyclic nitrogen atoms of the afore-mentioned heterocyclic residue may, if desired, be substituted by a hydrocarbon residue, especially by a lower aliphatic hydrocarbon residue, such as a methyl group. They may also be present as quaternary ammonium salts.

From among the new compounds the following deserve special mention:

3-anilino-rifamycin S and -rifamycin SV
3-para-ethylanilino-rifamycin S and -rifamycin SV
3-ortho-, 3-meta- and 3-para-toluidino-rifamycin S
    and -rifamycin SV
3-xylidino-rifamycin S and SV
3-(α-naphthylamino)-rifamycin S and SV
3-(β-naphthylamino)-rifamycin S and SV
3-[(4-pyridyl)-amino]-rifamycin S and SV
3-[(2-pyridyl)-amino]-rifamycin S and SV
3-[(3-pyridyl)-amino]-rifamycin S and SV
3-[(2,4-dimethylamino-6-pyrimidinyl)-amino]-
    rifamycin S and SV
3-[(4,6-dimethylamino-2-pyrimidinyl)-amino]-
    rifamycin S and SV
3-[(6-pyrimidinyl)-amino]-rifamycin S and SV
3-[(2-pyrimidinyl)-amino]-rifamycin S and SV
3-[(2-thiazolyl)-amino]-rifamycin S and SV
3-[2-imidazolyl)-amino]-rifamycin S and SV and their alkali metal salts and acid addition salts.

The new 3-amino-rifamycin S derivatives of the above Formula I and their afore-mentioned hydrogenated derivatives are in general of green colour; they are insoluble in water but readily soluble in most organic solvents such as alcohols, halogenated hydrocarbons, esters, dioxane and the like. On treatment with a reducing agent, for example hydrosulphite, dithionite or especially ascorbic acid, they yield the yellow, generally crystalline hydroquinones of the Formula II or their hydrogenated derivatives. When the hydroquinones are treated in an alkaline solution with a mild oxidant, such as potassium ferricyanide or even atmospheric oxygen, they are converted into the quinones.

The hydroquinones form alkali metal salts whose aqueous solutions are substantially of neutral reaction. If the residue of the 3-substituent contains acid groups, the quinones may likewise be present in the form of their alkali metal salts. When quinones and hydroquinones, which contain on the residue of the 3-substituent a basic group, are reacted with acids, they furnish acid addition salts and possibly also quaternary ammonium salts, especially with esters of lower alkanols with hydrohalic acids, sulphuric acid or sulphonic acids. The acid addition salts are advantageously formed with acids that are capable of forming therapeutically acceptable salts. Such acids are, for example, the hydrohalic, sulphuric and phosphoric acids, nitric and perchloric acid; aliphatic, alicyclic, aromatic or heterocyclic carboxylic or sulphonic acids such as formic, acetic, propionic, succinic, glycollic, lactic, malic, tartaric, citric, ascorbic, maleic, hydroxymaleic or pyruvic acids; phenylacetic, benzoic, para-aminobenzoic, anthranilic, para-hydroxybenzoic, salicylic, para-aminosalicylic, embonic, methanesulphonic, ethanesulphonic, hydroxyethanesulphonic, ethylenesulphonic acid; halogenbenzenesulphonic, toluenesulphonic or naphthalenesulphonic acids or sulphanilic acid; methionine, tryptophan, lysine or arginine.

These or other salts of the new compounds, for example their picrates, may also be used for purifying the resulting bases by converting the bases into salts, isolating the salts and liberating the bases again from them. In view of the close relationship between the bases in the free form and in the form of their salts what has been said above and below with reference to the free bases concerns also the corresponding salts wherever possible and suitable.

If desired, the new compounds of this application may also be present in the form of their tautomers.

The new compounds possess valuable pharmacological properties. Thus, they display especially a bacteriostatic activity, as can be shown by bacteria cultivation tests. The new compounds may therefore be used as chemotherapeutics. The new compounds are also valuable intermediates for the manufacture of other useful substances, especially of pharmacologically active products. Special mention deserves 3-anilinorifamycin SV which, for example, has a pronounced bacteriostatic effect upon 3 strains of *Staphylococcus aureus* in doses of 0.0035 mg./ml.

The new compounds may also be used as disinfectants, additives to animal fodders and for preserving victuals.

The new compounds are obtained when rifamycin S or rifamycin O, or a derivative thereof that is at least partially hydrogenated in positions 16, 17, 18, 19, 28 and 29, is reacted with a primary amine of the formula $NH_2$—R (where R has the same meaning as in Formulae I and II) and the resulting 3-amino substitution product of rifamycin S or rifamycin SV of the Formula I or II or of the afore-mentioned hydrogenated derivatives is isolated and/or, if desired, before or after the isolation a hydroquinone obtained is oxidised to a quinone, or a quinone is reduced to a hydroquinone, and the said 3-amino substitution product of rifamycin S or rifamycin SV is isolated and/or, if desired, the isolated compound is hydrogenated with catalytically activated hydrogen with the use of a nickel or palladium catalyst or with Raney nickel, and/or a resulting compound is converted into a salt or quaternary ammonium salt thereof.

The reaction with rifamycin S or with a hydrogenated derivative thereof is advantageously carried out in a solvent that is free from hydroxyl groups, for example chloroform, methylcellosolve, tetrahydrofuran or especially in a nonpolar solvent, for example in aromatic hydrocarbon such as benzene or preferably dioxane.

The condensation, starting from rifamycin O, is preferably performed in the presence of a solvent, especially a polar solvent or solvent mixture, for example in chloroform+methanol+water, water-saturated n-butanol, dioxane, tetrahydrofuran or their mixtures with methanol and/or water.

The reaction is advantageously carried out at room temperature, or when it proceeds slowly at an elevated temperature, for example at 50° to 150° C. The progress of the reaction can be checked by thin-layer chromatography. It has been observed that the reaction speed depends also on the structure of the amine. It is advantageous to use a large excess (5 to 10 mols) of amine. If the amine is liquid, the reaction may be conducted in the absence of a solvent.

The reaction product is generally partially present in the form of the quinone and partially of the hydroquinone in the reaction solution. It is advantageous to oxidize the reaction product wholly to the quinone in the reaction solution or to reduce it to the hydroquinone and to isolate it in this form. The oxidation is advantageously carried out with the above-mentioned oxidants or with hydrogen peroxide or ammonium persulphate; the reduction is best achieved with ascorbic acid or with a salt of this acid.

To isolate the process products the conventional processing and purifying methods may be employed, for example extraction with an organic solvent, or distribution between different solvents, chromatography and/or crystallization. It may be advantageous to extract the desired process products from the organic reaction solution in the form of their hydroquinones with aqueous neutral to weakly alkaline buffer solutions.

The aromatic or heterocyclic amines used as starting materials have the composition corresponding to the amino group defined above. Preferred use is made of amines that give rise to the particularly active final products mentioned above.

The invention includes also any variant of the process in which an intermediate obtained at any stage of the process is used as starting material and any remaining step/steps is/are carried out or in which the starting materials are formed under the reaction conditions.

The new compounds may be used, for example, in the form of pharmaceutical preparations containing them in conjunction or admixture with an organic or inorganic, solid or liquid pharmaceutical excipient suitable for local, enteral or parenteral administration. Suitable excipients are substances that do not react with the new compounds, for example water, gelatin, lactose, starches, stearyl, alcohol, magnesium stearate, talcum, vegetable oils, benzyl alcohols, gums propyleneglycol, polyalkyleneglycols, white petroleum jelly, cholesterol or other known medicinal excipients. The pharmaceutical preparations may be, for example, tablets, dragees, ointments, creams or capsules, or in liquid form solutions, suspensions or emulsions. They may be sterilized and/or may contain assistants such as preserving, stabilizing, wetting or emulsifying agents, solution promoters, salts for regulating the osmotic pressure or buffers. They may also contain other therapeutically valuable substances. The preparations are formulated by the usual methods.

The new compounds may also be used in veterinary medicine, for example in one of the forms mentioned above.

The following examples illustrate the invention.

EXAMPLE 1

A solution of 2.5 g. of rifamycin S in 5 ml. of aniline is kept for several days at room temperature. For processing, the solution is diluted with an abundance of ether and the excess aniline is extracted with citric acid. The ethereal solution is dried and evaporated. The residue is dissolved in aqueous methanol, ascorbic acid and some sodium ascorbate are added, and the batch is left to itself for some time, then mixed with sodium chloride solution and repeatedly extracted with chloroform. The residue obtained on evaporation of the chloroform solution is chromatographed on silica gel, using as eluant chloroform with a gradient of acetone. The bulk of the collected material forms a pure yellow eluate; brown and reddish shares are discarded. The desired product crystallizes from methanol and from aqueous acetone. The product obtained is 1.8 g. of 3-anilino-rifamycin SV melting at 165 to 166° C.

EXAMPLE 2

A mixture of 14 g. of rifamycin S and 6 g. of 4-aminopyridine in 100 ml. of dioxane is heated on a water bath for 15 minutes; during this time the reaction mixture turns solid. Chloroform is added and the whole stirred for 1 hour with an excess of potassium ferricyanide solution. The chloroform phase is then separated, copiously diluted with ether and repeatedly extracted with citric acid solution of 3% strength. The combined citric acid extracts are rendered alkaline with sodium bicarbonate and exhaustively extracted with chloroform. The chloroform extract contains the 3-[(4-pyridyl)-amino]rifamycin S. To produce the hydroquinone of this substance the chloroform extract is evaporated, and the residue is dissolved in methanol of 90% strength and reduced with ascorbic acid. The hydroquinone crystallizes out rapidly; it is recrystallized from methanol and yields over 10 g. of 3-[(4-pyridyl)-amino]-rifamycin SV in yellow crystals which on being heated gradually char and have no sharp melting point.

EXAMPLE 3

A solution of 20 g. of rifamycin O in 40 ml. of aniline is heated for 1 hour on a boiling water bath. As can be shown by thin-layer chromatography there is first formed a red compound which on being heated in solution is gradually converted into a green substance. To isolate the green substance the bulk of the excess aniline is evaporated under a high vacuum, the residue taken up in chloroform and the residual aniline is removed by repeated agitation with aqueous citric acid solution. The chloroform phase is stirred for some time with an excess of aqueous potassium ferricyanide solution, dried and evaporated. Chromatography on neutral silica gel with chloroform and a gradient of acetone isolates the green phase which is then reduces with ascorbic acid in aqueous methanol, with the colour changing to yellow. Sodium chloride solution is added and the yellow hydroquinone is extracted with chloroform. The chloroform solution is dried and evaporated and the remaining 3-anilino-rifamycin SV is crystallized from aqueous methanol. There are obtained 8.5 g. of yellow crystals melting at 165° to 166° C.

EXAMPLE 4

Pharmaceutical preparation containing 3-anilino-rifamycin SV as chemotherapeutics for parenteral administration:

25 mg. of 3-anilino-rifamycin SV (sodium salt) are dissolved in 1 ml. of distilled water. This solution is sterilized by filtration and lyophilized at −30° C. The dry product obtained in this manner is diluted, for example with 50 ml. of distilled and sterilized water or with 100 ml. of physiological saline solution, and thus used for the manufacture of solutions for injection.

We claim:
1. A member selected from the group consisting of a compound of the formulae

(I)

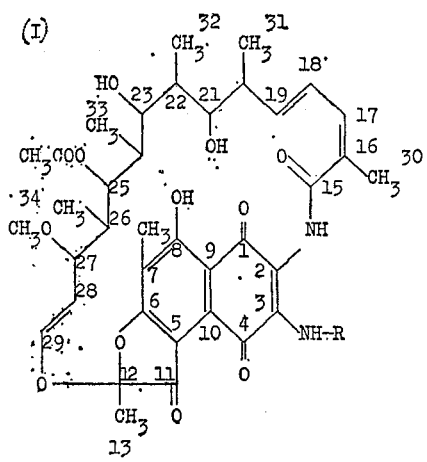

and

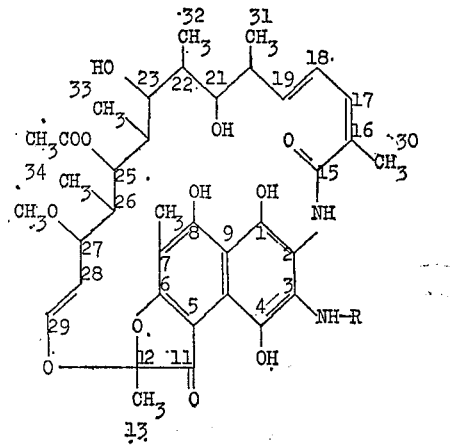

in which R represents a member selected from the group consisting of phenyl, naphthyl, phenyl or naphthyl substituted by lower alkyl, pyridyl-2, pyridyl-3, pyridyl-4, pyridyl-2, pyridyl-3 or pyridyl-4 substituted by lower alkyl, and a 16-, 17-, 18-, 19-tetrahydro derivative of such compounds or a 16-, 17-, 18-, 19-, 28- and 29-hexahydro derivative of such compounds, and therapeutically acceptable salts and lower alkyl quaternary ammonium halides, sulfates or sulfonates of these compounds.

2. An alkali metal salt of a compound of Formula II of claim 1.

3. A compound as claimed in claim 1, wherein in the formulae R signifies phenyl radical.

4. A compound as claimed in claim 1, wherein the formulae R signifies tolyl radical.

5. A compound as claimed in claim 1, wherein the formulae R signifies an ethylphenyl radical.

6. A compound as claimed in claim 1, wherein the formulae R signifies xylyl radical.

7. A compound as claimed in claim 1, wherein in the formulae R signifies naphthyl radical.

8. A compound as claimed in claim 1, wherein in the formulae R signifies pyridyl radical.

(References on following page)

References Cited

UNITED STATES PATENTS

| | | | |
|---|---|---|---|
| 3,338,888 | 8/1967 | Bickel et al. | 260—239.3 |
| 3,342,810 | 9/1967 | Maggi et al. | 260—239.3 |
| 3,349,082 | 10/1967 | Maggi et al. | 260—239.3 |

OTHER REFERENCES

Fieser et al., "Organic Chemistry," 3rd ed., pp. 716–719 (Reinhold) (1956).

Bernthsen and Sudborough, "Organic Chemistry," 4th edition, pp. 499–500 (Blacki) (1941).

HENRY R. JILES, Primary Examiner

R. T. BOND, Assistant Examiner

U.S. Cl. X.R.

428—244, 251, 263, 270, 272, 273

CASE 6039/E

PO-1050
(5/69)

UNITED STATES PATENT OFFICE
CERTIFICATE OF CORRECTION

Patent No. 3,542,765      Dated November 24, 1970

Inventor(s) HANS BICKEL ET AL

It is certified that error appears in the above-identified patent and that said Letters Patent are hereby corrected as shown below:

Column 6, lines 63, 65, 67, 69, 71 and 73, delete "radical".

Signed and sealed this 13th day of July 1971.

(SEAL)
Attest:

EDWARD M. FLETCHER, JR.
Attesting Officer

WILLIAM E. SCHUYLER, JR
Commissioner of Patents